Patented Apr. 5, 1932

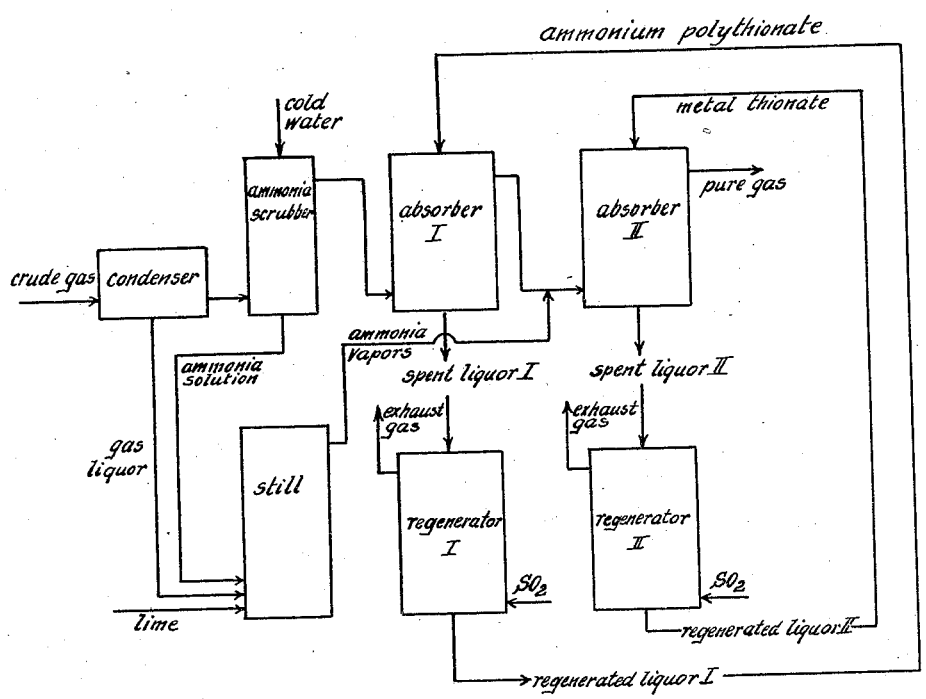

1,852,161

UNITED STATES PATENT OFFICE

CHRISTIAN J. HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

GAS PURIFICATION

Original application filed August 20, 1923, Serial No. 300,945, and in Germany October 22, 1927. Divided and this application filed December 4, 1929. Serial No. 411,687.

My invention refers to the treatment of gases, more especially gases such as result in the distillation of coal and other carbonaceous material and is diagrammatically illustrated by the accompanying flow sheet. It is a particular object of my invention to provide means whereby the ammonia and sulfur which are contained in such gases, the latter mostly under the form of hydrogen sulfide, can be recovered from the gases in an easier and more perfect manner than was hitherto possible.

It is known to recover the ammonia and hydrogen sulfide from gases by means of solutions of metal thionates. In this process there results metal sulfide and a solution of ammonium thionate and in some cases also free sulfur.

The metal sulfide, which may be ferric sulfide, manganese sulfide or zinc sulfide is redissolved by acting thereon with sulfur dioxide and there results a metal thionate solution and free sulfur. This solution has hitherto been treated further in such manner that the solution containing, besides sulfur, metal and ammonium thionates in solution was decomposed by heating into sulfate and sulfur, and the metal (iron, manganese or zinc) was removed by treating the sulfate solution with fresh gas before starting the gas purification process proper.

The process above described involves the great disadvantage that in the case where iron is present, iron disulfide ($FeS_2$) is obtained, which is not soluble in sulfur dioxide and other acids.

The metal thionate solutions described are further able only to take up ammonia and hydrogen sulfide in the predetermined proportion of $2NH_3 : 1H_2S$. Now in view of the fact that the gases resulting for instance in the distillation of coal always contain more hydrogen sulfide (gas resulting in the distillation of Ruhr coal about 50 per cent, English coal partly 100 to 200 per cent more than corresponds to the above proportion), a process of purification as above described always leaves a more or less considerable proportion of hydrogen sulfide in the gas.

It is further known to remove hydrogen sulfide from gases free from ammonia by different means such as
 1. Solutions of polythionates,
 2. Solutions of thiosulfates, to which sulfur dioxide is added,
 3. Suspensions of ferric hydroxide.

The means recited above for recovering the hydrogen sulfide differ as regards their velocity of reaction.

The slowest acting is the solution of polythionates while a thiosulfate solution, to which sulfur dioxide is added, will act somewhat more quickly. However the velocity of reaction of these solutions is always so small that in the case of polythionate solution and a gas containing for instance 0,8 per cent $H_2S$, only 33 per cent of the hydrogen sulfide can be removed, with a solution of thiosulfate and sulfur dioxide only about 50 per cent per unit of time.

On the other hand a suspension of ferric hydroxide will act on a gas washing liquor having neutral or slightly alkaline reaction so favorably that the total removal of hydrogen sulfide can be effected under commercial conditions.

Unfortunately the use of suspensions of ferric hydroxide involves the great disadvantage, that when the spent washing liquor is regenerated with air or another gas containing oxygen, there results a mixture of ferric hydroxide and sulfur and the separation of the sulfur from the iron sludge is very expensive. One is further forced to keep the percentage of iron in such solutions as low as possible in order to obtain the most favorable proportion between the sulfur and the iron. This entails the drawback, that the absorbing capacity of such washing liquor for hydrogen sulfide is comparatively small.

With an iron content of about 2 kgs. per cubicmeter of the solution, not more than 100 cubicmeter gas can be treated at the utmost.

In my copending application for patent of the United States Serial Number 300,945, I have described a method of treating coke oven gases for the recovery therefrom of useful admixtures, which allows obviating the drawbacks inherent in both absorption modes by carrying them out in succession. It consists in treating the gas with a suspension of iron or manganese hydroxide to remove part of the hydrogen sulfide, whereupon the gas is washed with a solution of iron or manganese thionate, by which the residual hydrogen sulfide and ammonia are absorbed.

This method allows removing, besides the ammonia contents, all the hydrogen sulfide from a gas irrespective of the ratio of the contents of these two admixtures and more particularly from a gas which contains even less than $2NH_3$ per $1H_2S$. On the other hand the elementary sulfur obtained can readily be recovered in a pure state free of ferric or manganese hydroxide by mixing the two different washing liquors when spent, dividing the mixtures into two parts and separately regenerating each part by treating it with air or sulfur dioxide, respectively. While the suspension of free sulfur and ferric or manganese hydroxide obtained by blowing with air is immediately reused, the liquor obtained by the introduction of sulfur dioxide, which contains iron or manganese thionates in solution and elementary sulfur in suspension, is first filtered, whereby the sulfur is obtained in a pure state free of ferric or manganese hydroxide.

This method which requires the use of ferric or manganese hydroxide can be modified in accordance with my invention by replacing the aqueous suspension of ferric or manganese hydroxide by a solution of a polythionate, preferably of an ammonium polythionate, which is obtained by introducing sulfur dioxide into a solution of ammonium thiosulfate, and allowing the reaction mixture to stand for a sufficient period of time, preferably at a slightly elevated temperature. It also displays an absorptive power on hydrogen sulfide even in the absence of free ammonia, ammonium thiosulfate and free sulfur being formed. While this solution is not so strongly absorptive as to remove the last traces of hydrogen sulfide from a gas within a convenient period of contact time, it may advantageously be used for removing that part of hydrogen sulfide from the crude gas, which exceeds the proportion of $2NH_3:1H_2S$.

In my copending application for patent of the United States Serial No. 411,688, filed of even date, I have described a method of treating coal distillation gases which comprises the step of preliminary washing the gas with a solution containing a complex compound of thiosulfate and sulfur dioxide. Such complex compound being distinguished from polythionates by its comparatively deeper yellow color and by its more intense absorption power on hydrogen sulfide, I wish it to be understood that the expression "polythionate" used in the present specification and in the claims affixed thereto is intended to mean a solution of a polythionate free of such complex compound of thiosulfate and sulfur dioxide.

It will be understood that by the combined use of two washing liquors, one of which contains ammonium polythionate, while the other one contains thionates of the iron group in solution, I may also completely remove all the ammonia and hydrogen sulfide contents from the gas irrespective of their proportion, i. e. even in such cases where an excess of hydrogen sulfide over the proportion $2NH_3:1H_2S$ is present. However, since the absorption of hydrogen sulfide by the metal thionate solution is only possible in the presence of an at least equivalent amount of ammonia, care should be taken to avoid an undue absorption of ammonia by the washing liquor containing the ammonium polythionate. For this reason I do not employ, in the practice of my invention the so-called direct way of separating ammonia, i. e. the treatment with the washing liquors of a gas which contains substantially all the original ammonia, but I prefer separating at least part of the ammonia from such gas prior to the washing with the solution of the ammonium polythionate. The ammonia thus separated is used in the other washing step for adjusting therein the proportion of ammonia and hydrogen sulfide, so as to bring about a complete absorption of both substances in this latter washing stage.

Whether substantially all the ammonia contained in the crude gas, or only part of it, should be separated out prior to the first washing step, depends on the additional amount of ammonia required in the second washing step.

If it is desired to use a semi-direct method in which the gas is first cooled down vigorously, so that part of the ammonia is dissolved in gas liquor to be recovered therefrom by distillation, preliminary washing of the gases in order to remove part of the hydrogen sulfide may be effected by means of a solution containing ammonium polythionate only in such cases where a comparatively high content of ammonia is present in the gas, or a comparatively great proportion of the hydrogen sulfide is absorbed in the first washing step. Otherwise, when subsequently washing, with an iron or manganese thionate solution, some ammonia would be missing.

The ammonia obtained by distilling the gas liquor can be introduced into the apparatus serving for washing the gas with thionate solutions either by conducting the vapors containing ammonia directly into the washing apparatus or into the gas before it enters same. It is however also possible to condense these vapors and to allow the condensed ammonia liquor thus obtained to run into the washing liquor containing iron thionate. There is no need for freeing the condensed ammonia liquor, when distilling same, from hydrogen sulfide and carbon dioxide.

If it is desired to use an indirect process, i. e. a process in which the gas is first cooled down, part of the ammonia contained therein being recovered in the form of gas liquor, while the rest is removed by washing the gas with water, and all the washing liquors containing ammonia being subjected to distillation to recover the ammonia, any desired proportion of hydrogen sulfide may be removed from the gas in the first washing step, the rest being absorbed in the second washing step, to which a sufficient part of the ammonia previously separated is added in order to obtain a complete absorption. The same is true with regard to the so-called indirect method.

The particular technical advantage of these modes of operating consists therein, that they can easily be adapted to widely differing conditions of operation and to all kinds of apparatus.

The purification effect is practically independent from all variations in the composition of the gas and in the production, more especially when different kinds of gas are produced. The possibility of accumulating either all or the greater part of the ammonia contained in the gas, renders it possible, for instance for the purpose of repairs, to temporarily throw out one or the other regeneration apparatus, so that the operation of the process is thus rendered uniform in an extraordinary degree.

In order to carry out the purification proper, a solution of ammonium thiosulfate which may for instance contain 10–60 per cent thiosulfate, is treated with sulfur dioxide in a separate apparatus so as to obtain an intensively yellow liquor, which is then introduced into the preliminary washer. However the required quantity of sulfur dioxide can also be added to the gas before it enters the preliminary washer. During the absorption free sulfur is formed from the hydrogen sulfide extracted from the gas and from a corresponding quantity of sulfur dioxide. It does not matter, whether solutions containing metal or free from metal are used. If the washing liquor is spent, I may regenerate it, or part of it, by introducing sulfur dioxide. The regenerated liquor is reused in cycle, but part of it may be withdrawn and heated for the recovery therefrom of ammonium sulfate and sulfur.

The concentrated ammonia obtained by distillation of the watery liquors containing ammonia is conducted without previous purification into the second washing stage operating with metal thionates. This solution, if spent, may also be regenerated by means of sulfur dioxide, and reused in cycle.

In order to recover from the concentrated solution of ammonium salt the sulfate and sulfur it is preferable, in contradistinction to the methods hitherto employed, according to which the ammonium sulfate solution was ultimately obtained freed from metal by acting thereon with fresh gas, to insert this step in the process, before the sulfate is formed, as only by so doing the formation of ferric disulfides ($FeS_2$) can be prevented, which cannot be dissolved by treatment with sulfur dioxide.

While the ferric or manganese sulfide thus formed is filtered off, and supplied to the regenerator, the filtrate, i. e. the solution of ammonia thionates may be treated with sulfur dioxide, and heated, in order to form ammonium sulfate and sulfur; but I may also admix this solution to the washing liquor of the other washing cycle.

My invention at the same time enables me to extract from the gas also the cyanogen contained therein and to convert same into ammonium thiocyanate, from which can then be obtained ammonium sulfate and sulfur in the manner described in my copending application for Letters Patent of the United States for "improvements in treating thiocyanates", Serial No. 298,617.

In this copending application I have shown that if ammonium thiocyanate is decomposed hydrolytically within the washing liquor, which results in the purification of coal distillation gases, such washing liquor containing either polythionates or corresponding quantities of thiosulfate and sulfur dioxide combined loosely with each other, or if such salts or sulfur dioxide or both are introduced into the liquor, or if ammonium bisulfite or ammonium sulfite are present therein, ammonium sulfate and free sulfur will result. I have further shown that these conversions of ammonium thiocyanate take place slowly at ordinary temperature and more rapidly at an elevated temperature, more especially under pressure, preferably at a temperature varying between 140–160° C.

As all the washing liquors used in the purification of the gas contain free sulfur and as the solution of ammonium polythionate as well as the iron thionate solutions can contain some ammonia during the washing procedure, they will also absorb from the gas all cyanogen compounds, which are converted into ammonium thiocyanate. When treating the spent washing liquors for the production of ammonium sulfate and sulfur, the ammonium thiocyanate is also converted into ammonium sulfate and free sulfur.

Thus the yield of ammonium sulfate in a gas washing process is materially increased for the first time. It is well known that the cyanogen compounds in the gas are formed thereby, that part of the ammonia present in the gas, being primarily formed from the nitrogen in the coal when acted upon by the incandescent coal and the hot products of distillation, is converted into cyanogen compounds. Thereby hitherto a material proportion of the ammonia, about 10–20 per cent and more was decomposed. The present process therefore enables me to obtain 10–20 per cent and more ammonium sulfate in excess of the quantity hitherto obtainable.

*Example 1*

A coke oven gas which contains at a temperature above its dew point about 8 grs. $NH_3$, 12 grs. $H_2S$ and 1.7 grs. cyanogen compounds (calculated as hydrocyanic acid) per cubicmeter, is washed in accordance with one of the methods above described. The total contents of cyanogen compounds is extracted by the washing liquors which may have an ammoniacal reaction. The solution obtained after separating out the iron in the form of FeS from the spent washing liquor of the second washing stage is supplied to the first washing cycle. Part of the regenerated liquor of this first cycle, from which free sulfur may be filtered off, and which thereafter contains besides ammonium polythionate also ammonium thiocyanate, is heated as described in my copending application for patent mentioned above, the thiocyanate is converted in the same manner as the ammonium polythionate into ammonium sulfate and sulfur. I thus obtain an increase in the yield of ammonium sulfate formed from the ammonia in the gas, which amounts to 13.4 per cent, the nitrogen contents of the cyanogen compounds being also converted into ammonia.

*Example 2*

A salt solution is treated as described with reference to Example 1, however the liquor is not heated at once, but is allowed to stand some time after the sulfur dioxide has been introduced. The thiosulfate in solution will then be gradually converted under the action of the sulfur dioxide into polythionates, in the first line tri- or tetrathionate. If the solution is then heated, which now mainly contains, instead of the thiosulfate and sulfur dioxide, polythionates and ammonium thiocyanate, the heating being effected as described with reference to Example 1, exactly the same result will be obtained including the same quantities of ammonium sulfate, sulfur and carbon dioxide as in Example 1.

Obviously the proportions given in the examples need not be the same throughout, but all such solutions can be treated for the recovery of sulfate and sulfur which contain, besides ammonium thiocyanate, ammonium thiosulfate, sulfur dioxide, ammonium polythionate and sulfuric acid. Sulfites and bisulfites may also be present.

In calculating the composition of such solutions the following rules apply:

1. 1 $NH_4CNS$ is decomposed to form sulfate and sulfur by means of
  a. 2 molecules $SO_2$
  b. 2 molecules polythionate
  c. 2 molecules thiosulfate + 3 molecules $SO_2$
  d. 8 molecules bisulfite
  e. 2 molecules thiosulfate + 2 molecules $H_2SO_4$.

2. Thiosulfates, sulfites, bisulfites and polythionates are decomposed under the formation of sulfate and sulfur according to the following rules:
  a. 2 molecules thiosulfate + 1 molecule polythionate
  b. 2 molecules sulfite + 1 molecule polythionate
  c. 2 molecules bisulfite + 1 molecule thiosulfate
  d. 2 molecules bisulfite + 1 molecule sulfite.

Any of these stocks may be mixed with each other in any desired proportion and in all cases sulfate and sulfur will result. If more sulfite or thiosulfate is present than corresponds to these prescriptions, non-decomposed thiosulfate and, if ammonium thiocyanate is present, also non-decomposed ammonium thiocyanate will remain in solution.

On the other hand if the solution contains more bisulfite or more polythionate than indicated above, there are formed besides sulfate and sulfur more or less free sulfuric acid and, if ammonium thiocyanate is present, also carbon dioxide. In such case, as shown above, the mother liquor rich in sulfuric acid which remains over when evaporating for the recovery of sulfate, is preferably returned into the decomposition vessel.

Various changes may be made in the details disclosed in the foregoing specification without departing from the invention or sacrificing the advantages thereof.

I claim:—

1. The method of treating coal distillation gases for the recovery therefrom of useful admixtures which comprises separating ammonia from such gas, thereafter washing said gas with a solution containing ammonium polythionate to remove part of the hydrogen sulfide contained in said gas, thereafter washing said gas with a solution of a thionate of the iron group in order to remove residual hydrogen sulfide from said gas and adding to the washing liquor containing a thionate of the iron group at least part of the ammonia previously separated.

2. The method of treating coal distillation gases for the recovery therefrom of useful admixtures which comprises cooling the gas below its dew point in order to condense a gas liquor containing part of the ammonia contained in said gas, washing the gas thus treated at a temperature below its dew point with water to remove residual ammonia, thereafter washing said gas with a solution containing ammonium polythionate to remove part of the hydrogen sulfide contained in said gas, thereafter washing said gas with a solution of a thionate of the iron group in order to remove residual hydrogen sulfide from said gas, and adding to the washing liquor containing a thionate of the iron group at least part of the ammonia previously separated.

In testimony whereof I affix my signature.
CHRISTIAN J. HANSEN.